(12) United States Patent
Hult et al.

(10) Patent No.: US 11,979,806 B2
(45) Date of Patent: May 7, 2024

(54) POLLING FROM DEVICE TO OTA CORE SYSTEM VIA OTA EDGE SYSTEM

(71) Applicant: GIESECKE+DEVRIENT MOBILE SECURITY GMBH, Munich (DE)

(72) Inventors: Jorgen Hult, Tullinge (SE); Par Thorstensson, Stockholm (SE); Tommy Thorstensson, Bromma (SE); Anders Kokeritz, Bromma (SE); Mats Bolander, Huddinge (SE); Joachim Eklund, Stockholm (SE); Mudit Gaur, Delhi (IN); Michael Ohlsson, Akersberga (SE)

(73) Assignee: GIESECKE+DEVRIENT MOBILE SECURITY GMBH, Munich (DE)

( * ) Notice: Subject to any disclaimer, the term of this patent is extended or adjusted under 35 U.S.C. 154(b) by 436 days.

(21) Appl. No.: 17/290,020

(22) PCT Filed: Oct. 24, 2019

(86) PCT No.: PCT/EP2019/025362
§ 371 (c)(1),
(2) Date: Apr. 29, 2021

(87) PCT Pub. No.: WO2020/088792
PCT Pub. Date: May 7, 2020

(65) Prior Publication Data
US 2021/0409919 A1   Dec. 30, 2021

(30) Foreign Application Priority Data
Oct. 29, 2018 (EP) ..................................... 18000844

(51) Int. Cl.
*H04W 4/50* (2018.01)
*G16Y 30/00* (2020.01)

(52) U.S. Cl.
CPC ............... *H04W 4/50* (2018.02); *G16Y 30/00* (2020.01)

(58) Field of Classification Search
CPC ........... H04W 28/021; H04W 28/0231; H04W 28/0236; H04W 28/0289; H04W 40/22;
(Continued)

(56) References Cited

U.S. PATENT DOCUMENTS 9,712,491 B2 *   7/2017   Burns ................. H04L 12/6418
2014/0372516 A1 * 12/2014   Watte .................... H04L 67/142
                                                              709/203
(Continued)

FOREIGN PATENT DOCUMENTS

WO   2015081063 A1   6/2015

OTHER PUBLICATIONS

International Search Report and Written Opinion from PCT Application No. PCT/EP2019/025362, dated Jan. 8, 2020.
(Continued)

*Primary Examiner* — Nathan S Taylor
(74) *Attorney, Agent, or Firm* — Workman Nydegger

(57) ABSTRACT

An OTA Edge system, constructed to: (1) receive polling requests, dedicated to an OTA Core system, from one or several mobile end de-vices; wherein an offload filter implemented in the OTA Edge system and constructed to: (2) accept polling requests from mobile end devices for which contents are present on the OTA Core system, and (2') reject polling re-quests from mobile end devices for which no contents are present on the OTA Core system.

10 Claims, 2 Drawing Sheets

(58) Field of Classification Search
CPC ......... H04W 28/02; H04W 4/50; H04W 4/70; H04W 8/20; H04W 88/16; G16Y 30/00; H04L 67/56
See application file for complete search history.

(56) References Cited

U.S. PATENT DOCUMENTS

| | | | |
|---|---|---|---|
| 2015/0156266 A1* | 6/2015 | Gupta | H04L 67/12 709/224 |
| 2017/0187597 A1* | 6/2017 | Nolan | H04L 43/0888 |
| 2018/0131785 A1* | 5/2018 | Sharma | H04L 65/102 |
| 2018/0183685 A1* | 6/2018 | Cook | H04W 4/08 |
| 2018/0212787 A1* | 7/2018 | Lee | H04L 41/0836 |
| 2018/0262533 A1* | 9/2018 | McCaig | H04L 63/1441 |
| 2019/0020718 A1* | 1/2019 | Mathews | H04L 67/55 |
| 2019/0028552 A1* | 1/2019 | Johnson, II | H04L 67/146 |
| 2019/0132347 A1* | 5/2019 | Wakid | H04L 63/1475 |
| 2020/0162556 A1* | 5/2020 | Wood | H04L 67/12 |
| 2020/0267201 A1* | 8/2020 | Rauschenbach | G06F 9/542 |

OTHER PUBLICATIONS

Extended Search Report from corresponding EP Application No. EP18000844.3, dated Feb. 4, 2019.
Pereira, "IoT-Gateway-Devices: Orientierung im Gerätedschungel," Industry of Things, Nov. 27, 2017, 12 pages.

* cited by examiner

US 11,979,806 B2

POLLING FROM DEVICE TO OTA CORE SYSTEM VIA OTA EDGE SYSTEM

FIELD OF THE INVENTION

The present invention relates to polling from devices, particularly IoT devices, to an OTA Core system via an OTA Edge system.

BACKGROUND OF THE INVENTION

Internet-of-Things (IoT) devices are mobile end devices, having a relatively low performance as compared to for example Smartphones, and enable a variety of objects (vehicles, sensors, cameras, machines, industrial plants, . . . ) to communicate with a background system, the so-called OTA Core system, via radio communication, namely via an Over-The-Air (OTA) communication link. An IoT device, other than a Smartphone, is a very simple device. Other than Smartphones which are able to directly communicate with the OTA Core system, IoT devices communicate with the OTA Core system via a Gateway relaying communication between the IoT device and the OTA Core system. Typically, several IoT devices are associated with one Gateway, for example in a Local Area Network LAN, and communicate to the OTA Core system only via their associated Gateway.

In the scheduled GSMA 5G mobile network system, Smartphones and IoT devices communicate in the same heterogeneous network architecture, providing both classical mobile network communication paths, such as 4G LTE or 3G or 2G, as well as IoT communication paths using OTA Edge systems taking more or less the functionality of Gateways of classical IoT mobile network systems. The OTA Edge system, on the one hand, fulfils tasks similar to the tasks of the classical IoT Gateway. The OTA Edge system, on the other hand, can be comprised of either a single Edge device, or of several interoperating Edge devices in close local relationship to each other. The OTA Edge system provides computing resources which are much more powerful than an IoT device, but which are very close to the IoT device, in contrary to the remote OTA core system.

Mobile end devices of IoT type that communicate to the OTA Core system via a Gateway are particularly known as: an IoT device installed in a vehicle; an IoT device installed in a car, also known as automotive M2M module; an IoT device installed in a railway vehicle; an IoT device installed in an industrial machine; an IoT device installed in an industrial plant; an IoT device installed in a smart home environment (i.e. an environment in a home, house, apartment or the like, in which devices such as household appliances (coffee maker, washing machine, climate control, heating, refrigerator, . . . ), media (e.g. music/film) devices, lighting devices (lamps) are enabled to communicate in an IoT network; an IoT device installed in a smart city environment (i.e. an environment in a city, town, or the like, in which devices typical for a city, town, . . . (roadside lamps, parking meters, toll collect appliances, buildings, public transportation vehicles, public transportation infrastructure elements, surveillance cameras, . . . ) are enabled to communicate in an IoT network); a smart metering device; an IoT device installed in a surveillance camera; an IoT device installed in a video camera; an IoT device installed in a digital photo camera.

IoT devices can host a Secure Element such as a UICC of some form factor, such as plug-in UICC (or SIM/USIM) card, embedded eUICC or other.

An OTA (Over-The-Air) Core system is often under high load. The OTA Core system is managing contents on the IoT mobile end device and, if there is one available, the Secure Element/UICC, for example by downloading new contents to the device. Usually, a large or even vast number of IoT mobile end devices will be provisioned with contents by one single OTA Core system. Technically, the provisioning is performed in that the IoT mobile end devices are polling the OTA Core system for available contents. This means that each IoT mobile end device regularly sends to the OTA Core system a polling request asking: "Do you have any content for me?". The vast majority of IoT mobile end devices polling requests, in a realistic scenario ~99.9%, will result in a negative response, that is that there is no content to fetch from the OTA Core system. Those requests will just put unnecessary load on the OTA Core system server or servers.

OBJECTIVE OF THE INVENTION

It is an object of the present invention to provide a provisioning solution that reduces the load on the OTA Core system due to polling requests from devices seeking to receive contents from the OTA Core system.

SUMMARY OF THE INVENTION

The OTA Edge system according to the present invention is constructed to receive polling requests, dedicated to an OTA Core system, from one or several mobile end devices. The OTA Edge system is characterized by an offload filter implemented in the OTA Edge system which is constructed to accept polling requests only from mobile end devices for which contents are present on the OTA Core system, however, reject polling requests from mobile end devices for which no contents are present on the OTA Core system.

Experiments have shown that, by introducing such an offload filter in the network, close to the device, in some cases as much as 99.9% of the polling traffic can be stopped, and only 0.1% of the polling traffic is let into the OTA Core system. Only the devices that actually have content to fetch will contact the OTA core system, the other devices will be blocked out already at the OTA Edge system. Particularly the scheduled 5G infrastructure scheduled to make use of Edge computing, where computing tasks are moved away from the central or Cloud Core computing system to a device-near, Edge-located or Fog computing system, can make advantage of the present invention.

According to some embodiments, the offload filter comprises a filter list and a processing means. The filter list lists identifiers of mobile end devices for which contents are present on the OTA Core system and doesn't list identifiers of mobile end devices for which no contents are present on the OTA Core system. The processing means evaluates the filter list and enforces the accepting or rejecting of polling requests. The processing means can be the normal CPU of the device or some other suitable processing means. As an identifier, the ICCID of the device can be used, or some other suitable identifier by which the OTA Edge system can unambiguously identify the device.

According to some embodiments, the OTA Edge system (passively) receives (i.e. OTA Cores system pushes the list) or retrieves (i.e. OTA Edge system pulls the list) a filter list from the OTA Core system, according to a predefined schedule, or/and whenever contents for mobile end devices have been added to or removed from the OTA Core system, so as to provide the OTA Edge system with an up-to-date filter list. The schedule can be that the filter list is sent in regular time intervals. Alternatively or in addition, the filter list can be sent whenever contents for mobile end devices are added to the OTA Core system. The contents can e.g. be received at the OTA Core system in a Batch file received from a Batch Manager. The Batch Manager stores content for multiple devices. Only when such content is to be downloaded to a device, it is moved from the Batch Manager to the OTA Core system for download to the device.

In some embodiments, the mobile end devices send their polling requests according to a fixedly predefined polling scheme. According to other embodiments, receiving of the filter list at the OTA Edge system initiates the OTA Edge system to invite those mobile end devices for which contents have been added to the OTA Core system to send a polling request.

According to some embodiments, said devices are associated with said OTA Edge system. Particularly, said devices can be associated with said OTA Edge system in a 5G Local Area Network or other Local Area Network.

In the latter embodiments, preferably the OTA Edge system accepts polling requests uppermost from mobile end devices associated with said OTA Edge system and rejects polling requests from mobile end devices not associated with said OTA Edge system, or associated only with other OTA Edge systems.

The polling requests of the mobile end devices are preferably dedicated to the OTA Core system, and the OTA Edge system is constructed to relay the polling requests from the respective mobile end device to the OTA Core system. This feature is for example fulfilled by a typical 5G Edge computing scenario in which devices address an OTA core system via polling requests relayed by an OTA Edge system.

The mobile end devices are according to embodiments Internet-of-Things (IoT) devices out of the group of mobile end devices comprising: an IoT device installed in a vehicle; an IoT device installed in a car; an IoT device installed in a railway vehicle; an IoT device installed in an industrial machine; an IoT device installed in an industrial plant; an IoT device installed in a smart home environment; a smart metering device; an IoT device installed in a surveillance camera; an IoT device installed in a video camera; an IoT device installed in a digital photo camera.

Preferably, the OTA Edge system is further constructed to forward said received and accepted polling requests to an OTA Core system. Subsequently, the OTA Core systems sends contents, and the OTA Edge systems receives those contents, the contents corresponding to the forwarded (i.e. the accepted) polling requests. Finally, the OTA Edge system forwards the contents received from the OTA Core system to the mobile end device from which the polling request was received. For rejected polling requests, no contents are retrieved from the OTA Core system.

BRIEF DESCRIPTION OF THE DRAWINGS

Embodiments of the invention will now be described with reference to the accompanying drawings, throughout which like parts are referred to by like references, and in which represents.

DETAILED DESCRIPTION OF THE INVENTION

Figure 1:
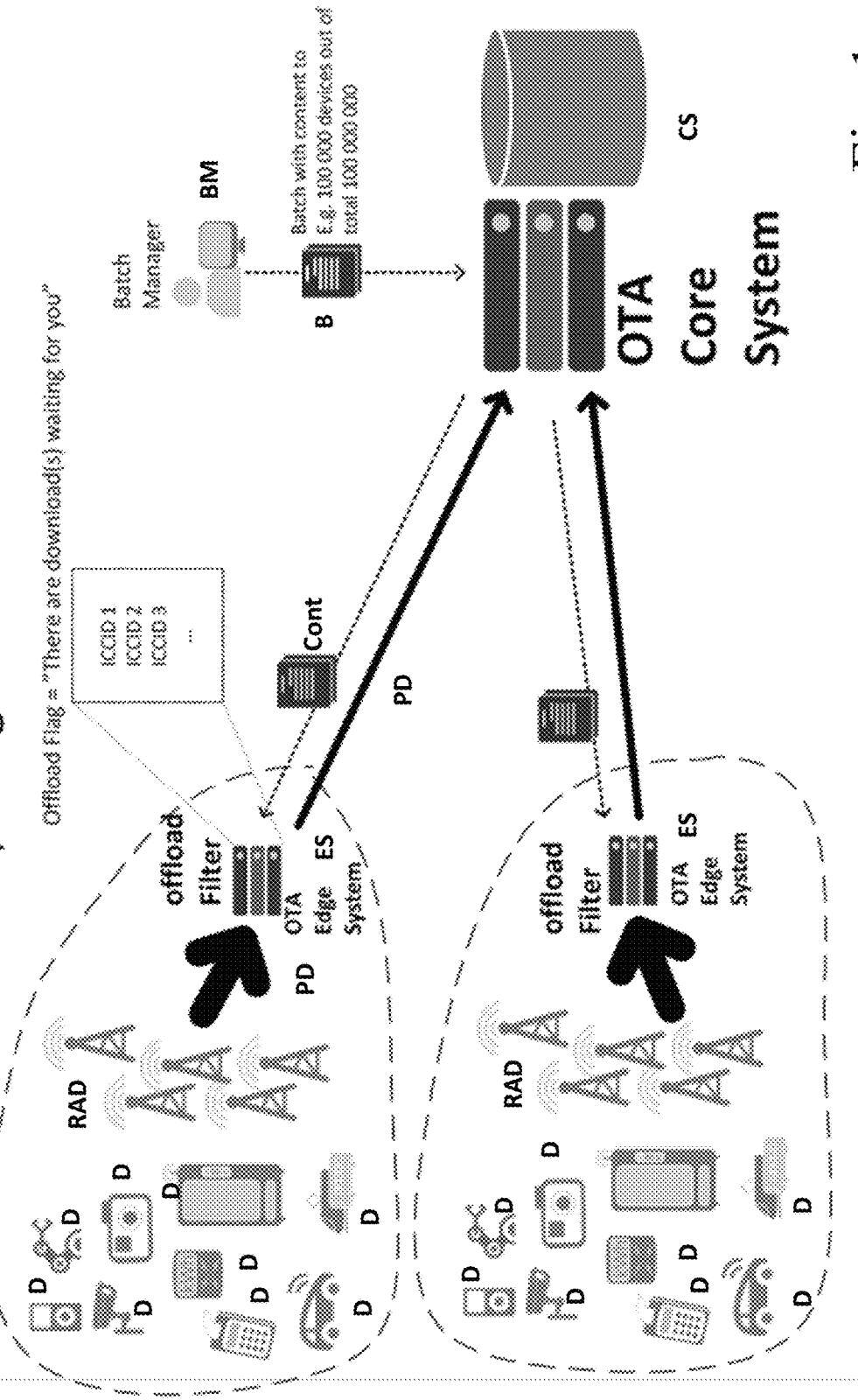
FIG. 1 an overview over an IoT OTA infrastructure.

FIG. 1 shows an overview over an IoT OTA infrastructure, comprising an OTA Core System CS, three OTA Edge systems ES, multiple IoT mobile end devices D, each associated to one of the OTA Edge systems ES, and a batch manager BM.

Figure 2:
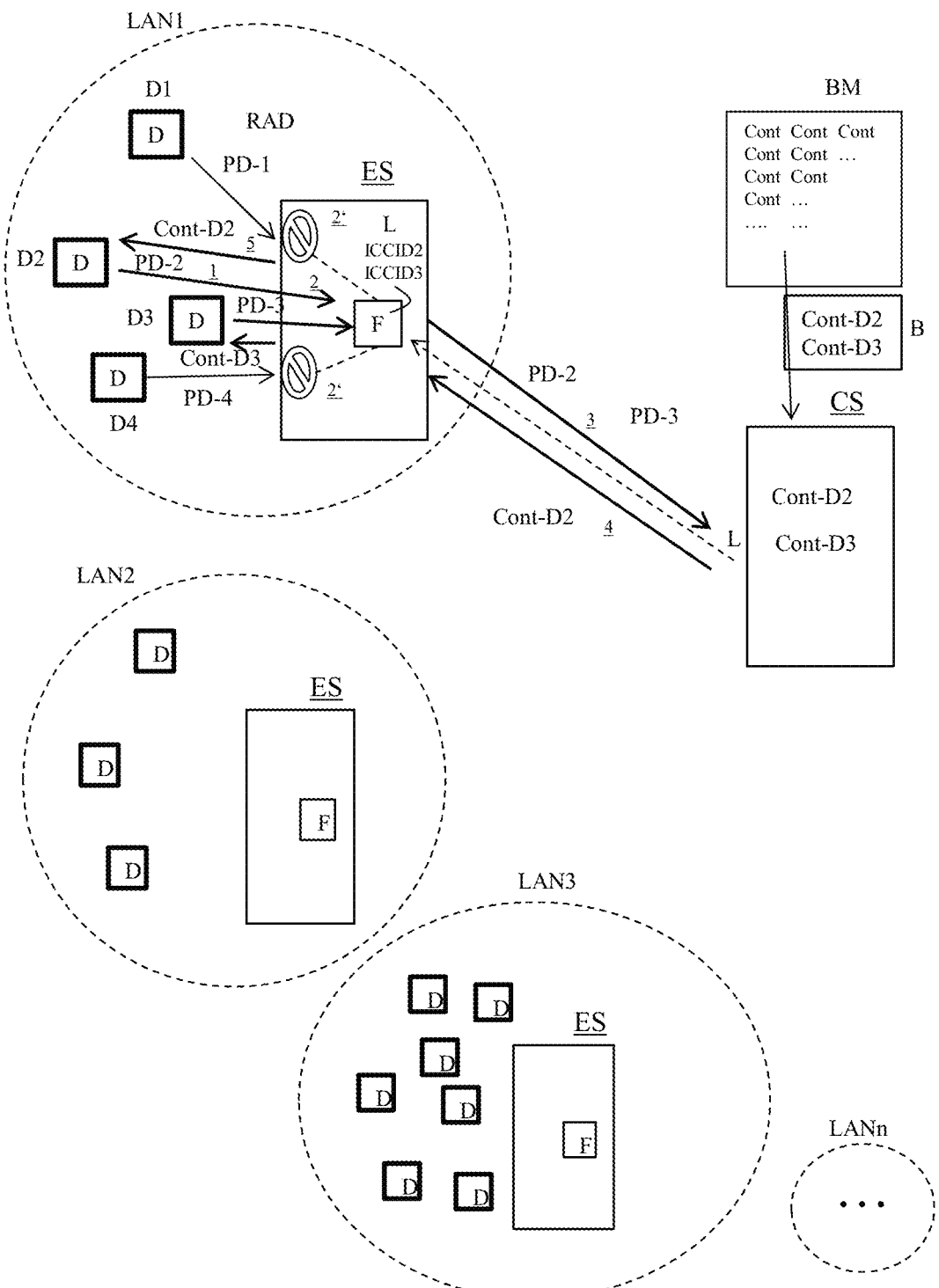
FIG. 2 a detailed partial view of the IoT OTA infrastructure of FIG. 1.

FIG. 2 shows a detailed partial view of the IoT OTA infrastructure of FIG. 1, comprising an OTA Core System CS, three OTA Edge systems ES, and another OTA Edge system ES only schematically shown, multiple IoT mobile end devices D, each associated to one of the OTA Edge systems ES, and a batch manager BM. Each of the IoT mobile end devices D communicates with the associated OTA Edge systems ES over a radio communications link RAD, for example a Narrow-Band IoT, NB-IoT, radio communications link. Each OTA Edge system ES and its associated IoT mobile end devices D are associated in a respective Local Area Network LAN1, LAN2, LAN3, LANn, . . . . Each OTA Edge system ES communicates with the OTA Core System CS over some suitable communications link.

The OTA Cores system CS provides contents Cont to be downloaded to devices D. The contents Cont are stored in the Batch Manager BM. Whenever some content Cont is to be provided to some device D, for example for the devices D2 and D3, the contents decided for download, for example Cont-2, Cont-3, are merged into a Batch file B, and the Batch file B is sent from the Batch Manager BM to the OTA Core system CS. Now the decided contents Cont-2, Cont-3 are present on the OTA Core system CS. According to embodiments of the invention, whenever new contents Cont-2, Cont-3 appear to be present on the OTA Core system CS, the OTA Core system CS downloads a filter list L to the OTA Edge system ES—see dashed line with arrow—so as to update the OTA Edge system ES on the newly occurred availability of new contents Cont for devices on the OTA Core system CS.

The OTA Edge system ES according to embodiments of the present invention as shown in FIG. 2 may include an offload filter F implemented in the OTA Edge system ES. The offload filter comprises a filter list L listing identifiers ICCID, here ICCID2 and ICCID3, of mobile end devices D, here D2 and D3, for which contents Cont, here Cont-2 and Cont-3, are present on the OTA Core system CS. For devices D not having listed their identifiers ICCID in the list L, for example mobile end devices D1, D4, no contents are present on the OTA Core system CS. The offload filter further comprises a processing means constructed to evaluate the filter list L and to enforce the accepting 2 or rejecting of polling requests PD. The processing means can be a regular CPU, or a dedicated processing means of the mobile end device D.

In the following, the filtering of polling requests PD, sent by IoT mobile end devices D and dedicated to the OTA Core system CS, at the OTA Edge system ES according to embodiments of the invention will be described.

The OTA Edge system ES according to the present invention comprises an offload filter F, according to the embodiments of FIG. 2 comprising the filter list L as described above.

When polling requests PD from IoT mobile end devices D are (1) received at the OTA Edge system ES, the offload filter F filters the polling traffic in that it applies the filter list L and (2) accepts polling requests PD-2, PD-3 from the two mobile end devices D2, D3 for which contents Cont-2, Cont-3 are present on the OTA Core system CS, whereas it (2') rejects polling requests PD-1, PD-4 from the two other mobile end devices D1, D4 associated in the same Local Area Network LAN1, and for which no contents are present on the OTA Core system CS. Out of the received polling requests PD, only the accepted polling requests (3) are forwarded to the OTA Core system CS. In reply, the OTA Core system CS sends the contents Cont-2, Cont-3, corresponding to the forwarded polling requests, to the OTA Edge system ES, to be (4) received at the OTA Edge system ES. The OTA Edge system ES (5) forwards said received contents Cont-2 or Cont-3 to the mobile end device D2 or D3, respectively, from which the polling request PD-2 or PD-3 was received.

By this filtering, unnecessary polling requests are rejected, so as to reduce superfluous polling traffic at the OTA Core system.

What is claimed is:

1. An Over-The-Air (OTA) Edge system, constructed to:
   (1) receive polling requests, associated with an OTA Core system, from one or several mobile end devices;
   wherein an offload filter is implemented in the OTA Edge system and constructed to:
      (2) accept polling requests from mobile end devices for which contents are present on the OTA Core system, and
      (2') reject polling requests from mobile end devices for which no contents are present on the OTA Core system;
   wherein the OTA Edge system is further configured to:
   (3) forward said received (1) and accepted (2) polling requests to an OTA Core system;
   (4) receive, from said OTA Core system, contents corresponding to said forwarded polling requests;
   (5) forward said received contents to the mobile end device from which the polling request was received.

2. The OTA Edge system according to claim 1, wherein the offload filter comprises:
   a filter list listing identifiers of mobile end devices for which contents are present on the OTA Core system, and not listing identifiers of mobile end devices for which no contents are present on the OTA Core system;
   a processing means constructed to evaluate the filter list and to enforce the accepting or rejecting of polling requests.

3. The OTA Edge system according to claim 2, wherein the OTA Edge system is constructed to receive or retrieve a filter list from the OTA Core system, according to a predefined schedule, or/and whenever contents for mobile end devices have been added to or removed from the OTA Core system, so as to provide the OTA Edge system with an up-to-date filter list.

4. The OTA Edge system according to claim 3, wherein OTA Edge system is constructed to receive filter list from the OTA Core system whenever contents for mobile end devices have been added to the OTA Core system, and
   wherein the receiving of the filter list initiates the OTA Edge system to invite those mobile end devices for which contents have been added to the OTA Core system to send a polling request.

5. The OTA Edge system according to claim 1, wherein said devices are associated with said OTA Edge system.

6. The OTA Edge system according to claim 5, wherein said devices are associated with said OTA Edge system in a 5G Local Area Network or other Local Area Network.

7. The OTA Edge system according to claim 5, wherein the OTA Edge system accepts polling requests from mobile end devices associated with said OTA Edge system and rejects polling requests from mobile end devices not associated with said OTA Edge system, or associated only with other OTA Edge systems.

8. The OTA Edge system according to claim 1, wherein the polling requests of the mobile end devices are associated with the OTA Core system, and the OTA Edge system is constructed to relay the polling requests from the respective mobile end device to the OTA Core system.

9. The OTA Edge system according to claim 1, wherein the mobile end devices are Internet-of-Things IoT devices out of the group of mobile end devices comprising:
   an IoT device installed in a vehicle;
   an IoT device installed in a car; an IoT device installed in a railway vehicle;
   an IoT device installed in an industrial ma-chine;
   an IoT device installed in an industrial plant;
   an IoT device installed in a smart home environment;
   an IoT device installed in a smart city environment;
   a smart metering device; an IoT device installed in a surveillance camera;
   an IoT device installed in a video camera;
   an IoT device installed in a digital photo camera.

10. A method for operating an Over-The-Air (OTA) Edge system, comprising the steps:
    (1) receive polling requests from one or several mobile end devices;
    wherein:
    a filtering procedure is executed in the OTA Edge system, comprising:
       (2) accept polling requests from mobile end devices for which contents are present on the OTA Core system, and
       (2') reject polling requests from mobile end devices for which no contents are present on the OTA Core system;
    (3) forward only the accepted ones of said received polling requests to an OTA Core system;
    (4) receive, from said OTA Core system, contents corresponding to said forwarded polling requests;
    (5) forward said received contents to the mobile end device from which the polling request was received.

* * * * *